(12) United States Patent
Wyganowski

(10) Patent No.: US 7,904,883 B2
(45) Date of Patent: Mar. 8, 2011

(54) LOCALIZABLE OBJECT PATTERN

(75) Inventor: Jaroslaw Ksawery Wyganowski, Fargo, ND (US)

(73) Assignee: Microsoft Corporation, Redmond, WA (US)

( * ) Notice: Subject to any disclaimer, the term of this patent is extended or adjusted under 35 U.S.C. 154(b) by 1266 days.

(21) Appl. No.: 11/292,052

(22) Filed: Dec. 1, 2005

(65) Prior Publication Data

US 2007/0169014 A1    Jul. 19, 2007

(51) Int. Cl.
*G06F 9/44* (2006.01)
*G06F 9/45* (2006.01)
*G06F 17/20* (2006.01)
*G06F 17/28* (2006.01)
*G06F 3/00* (2006.01)

(52) U.S. Cl. ............. 717/120; 717/108; 717/137; 704/8; 715/264; 715/265; 715/703

(58) Field of Classification Search ........................ 704/8
See application file for complete search history.

(56) References Cited

U.S. PATENT DOCUMENTS

| 5,907,326 | A |   | 5/1999 | Atkin et al. | 345/334 |
| 5,915,253 | A | * | 6/1999 | Christiansen | 707/103 R |
| 6,025,836 | A | * | 2/2000 | McBride | 715/750 |
| 6,275,790 | B1 |  | 8/2001 | Yamamoto et al. | 704/8 |
| 6,334,101 | B1 | * | 12/2001 | Hetherington et al. | 704/8 |
| RE37,722 | E | * | 5/2002 | Burnard et al. | 713/1 |
| 6,735,759 | B1 |  | 5/2004 | Yamamoto et al. | 717/136 |
| 6,782,529 | B2 |  | 8/2004 | Kumhyr | 717/111 |
| 6,983,238 | B2 | * | 1/2006 | Gao | 704/8 |
| 7,516,442 | B2 | * | 4/2009 | Wu et al. | 717/120 |
| 2002/0046240 | A1 | * | 4/2002 | Graham et al. | 709/203 |
| 2002/0087958 | A1 | * | 7/2002 | Krause | 717/166 |
| 2002/0138518 | A1 |  | 9/2002 | Kobayashi et al. | 707/513 |
| 2002/0144253 | A1 |  | 10/2002 | Kumhyr | 717/170 |
| 2003/0046059 | A1 | * | 3/2003 | Litster et al. | 704/8 |
| 2003/0046670 | A1 |  | 3/2003 | Marlow | 717/140 |
| 2004/0230416 | A1 | * | 11/2004 | Ye et al. | 704/5 |
| 2004/0236715 | A1 | * | 11/2004 | Krebs | 707/1 |

FOREIGN PATENT DOCUMENTS

EP    1100004 A2 * 5/2001
WO    WO 96/15493    5/1996

OTHER PUBLICATIONS

"Redbooks Technote How to Organize a Localization Pack", http://publib-b.boulder.ibm.com/Redbooks.nsf/0/e8182bf46d53e58285256cac00148ea8?OpenDocument&Highlight=0,locale, at least by Sep. 21, 2005.
"Oracle9iAS Reports Services and XML", http://www.di.unipi.it/~ghelli/bdl/A97329_03/web.902/a88894/adx14rep.htm, at least by Sep. 21, 2005.
"Enterprise Localization Toolkit; Summary", http://msdn.microsoft.com/library/default.asp?url=/library/en-us/dnaspp/html/entloctoolkit.asp, at least by Dec. 1, 2005.
"Locale Data Markup Language; Introduction" http://www.openi18n.org/specs/ldml/1.0/ldml-spec.htm, at least by Dec. 1, 2005.

* cited by examiner

*Primary Examiner* — Michael J Yigdall
*Assistant Examiner* — Todd Aguilera
(74) *Attorney, Agent, or Firm* — Christopher L. Holt; Westman, Champlin & Kelly, P.A.

(57) ABSTRACT

A computer-implemented method of handling localizable objects is provided. The method includes the step of obtaining an initial class containing localizable properties and non-localizable properties. The initial class is then transformed into a base-part class and a translation-part class. A localization tool for performing the transformation is also provided.

12 Claims, 8 Drawing Sheets

```
/* Code that is not culture-aware */
SimpleItem item = new SimpleItem();
item.BarCode = "0123";
item.Name = "Screwdriver";
item.Description = "Titanium screwdriver";

Console.WriteLine("Item.BarCode is " + item.BarCode);
Console.WriteLine("Item.Name is " + item.Name);
Console.WriteLine("Item.Description is " + item.Description);
```

FIG. 5-1

*Item.BarCode is 0123*
*Item.Name is Screwdriver*
*Item.Description is Titanium screwdriver*

FIG. 5-2

```
/* Code that is culture-aware */
SimpleItem item = new SimpleItem();
item.BarCode = "0123";
item.CurrentLanguage = Language.English;
item.Name = "Screwdriver";
item.Description = "Titanium screwdriver";
item.CurrentLanguage = Language.German;
item.Name = "Schraubenzieher";
item.Description = "Titanschraubenzieher";

/* Display item in English */
item.CurrentLanguage = Language.English;
Console.WriteLine("English translation:");
Console.WriteLine("Item.BarCode is " + item.BarCode);
Console.WriteLine("Item.Name is " + item.Name);
Console.WriteLine("Item.Description is " + item.Description);

/* Display item in German */
item.CurrentLanguage = Language.German;
Console.WriteLine("German translation:");
Console.WriteLine("Item.BarCode is " + item.BarCode);
Console.WriteLine("Item.Name is " + item.Name);
Console.WriteLine("Item.Description is " + item.Description);
```

FIG. 6-1

*English translation:*
*Item.BarCode is 0123*
*Item.Name is Screwdriver*
*Item.Description is Titanium screwdriver*
*German translation:*
*Item.BarCode is 0123*
*Item.Name is Schraubenzieher*
Item.Description is Titanschraubenzieher

```
GENERATE THE BASE-PART CLASS SUCH
THAT IT CONTAINS ALL PROPERTIES OF
THE INITIAL CLASS WHICH CANNOT BE      ─740
TRANSLATED AND ALL LOCALIZABLE
PROPERTIES OF THE INITIAL CLASS IN A
         BASE LANGUAGE
```

```
APPLY A LOCALIZABLE OBJECT PATTERN TO
    THE INITIAL CLASS TO GENERATE THE      ─750
BASE-PART CLASS AND THE TRANSLATION-
              PART CLASS
```

FIG. 7-5

LOCALIZABLE OBJECT PATTERN

BACKGROUND

Decentralized and interactive, the Internet allows people to access and exchange information, and to communicate with one another regardless of physical proximity. This interconnectivity is an expression of globalization, the pace of which has accelerated over the last few decades, along with a growing awareness of the world as a whole. E-commerce has changed traditional business practices by providing direct access to information and products. As the number of non-English speaking people with access to the Internet grows, companies must evaluate the usability of their Web sites and other products to increase the number of customers. User interface and data in user native languages is one aspect of global application availability.

Storage and retrieval of objects that are at least partially localizable presents numerous challenges. In this context, the term "localizable" refers to objects or object fields that contain data that can be translated into multiple languages. Issues relating to storage and retrieval of objects that are at least partially localizable include:

Transparency: some people/applications that communicate with localizable objects always use one language and they do not have to be aware, or do not care, that the object can be translated into multiple languages.

Performance: people/applications that do not care about multiple languages should not be penalized by performance degradation related to storage of a complex data structure when using a localizable object in a simple manner (one language).

Identity: an object should retain its identity when translated into another language, i.e., translation should not require creating another object, yet this is currently often required.

The discussion above is merely provided for general background information and is not intended to be used as an aid in determining the scope of the claimed subject matter. The claimed subject matter is not limited to implementations that solve any or all of the issues noted in the background.

SUMMARY

A computer-implemented method of handling localizable objects is provided, as is a localization tool for performing transformations of classes to a format which supports localizability. Using the method and tool, localizable fields in languages other than a base language can be made transparent to users. In an example embodiment, the method includes obtaining an initial class containing localizable properties and non-localizable properties. The initial class definition is then transformed into a base-part class and a translation-part class. The translation-part class definition contains only localizable fields and a language identifying field.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 3-1 is a diagrammatic illustration of an example input or initial class to the localization tool shown in FIG. 2 FIG. 3-2 is a diagrammatic illustration of an example localization supporting class output by the localization tool shown in FIG. 2.

FIG. 4-1 is a diagrammatic illustration of an example of an input class.

FIG. 4-2 is a diagrammatic illustration of an example of a base-part class and a translation-part class generated from the example input class shown in FIG. 4-1.

FIGS. 5-1 and 5-2 are illustrations of application program interface experiences.

FIGS. 6-1 and 6-2 are illustrations of application program interface experiences.

FIG. 7-1 is a flow diagram illustrating a method embodiment.

FIGS. 7-2 through 7-5 are illustrations of more particular embodiments of the steps shown in FIG. 7-1.

DETAILED DESCRIPTION

Figure 1:
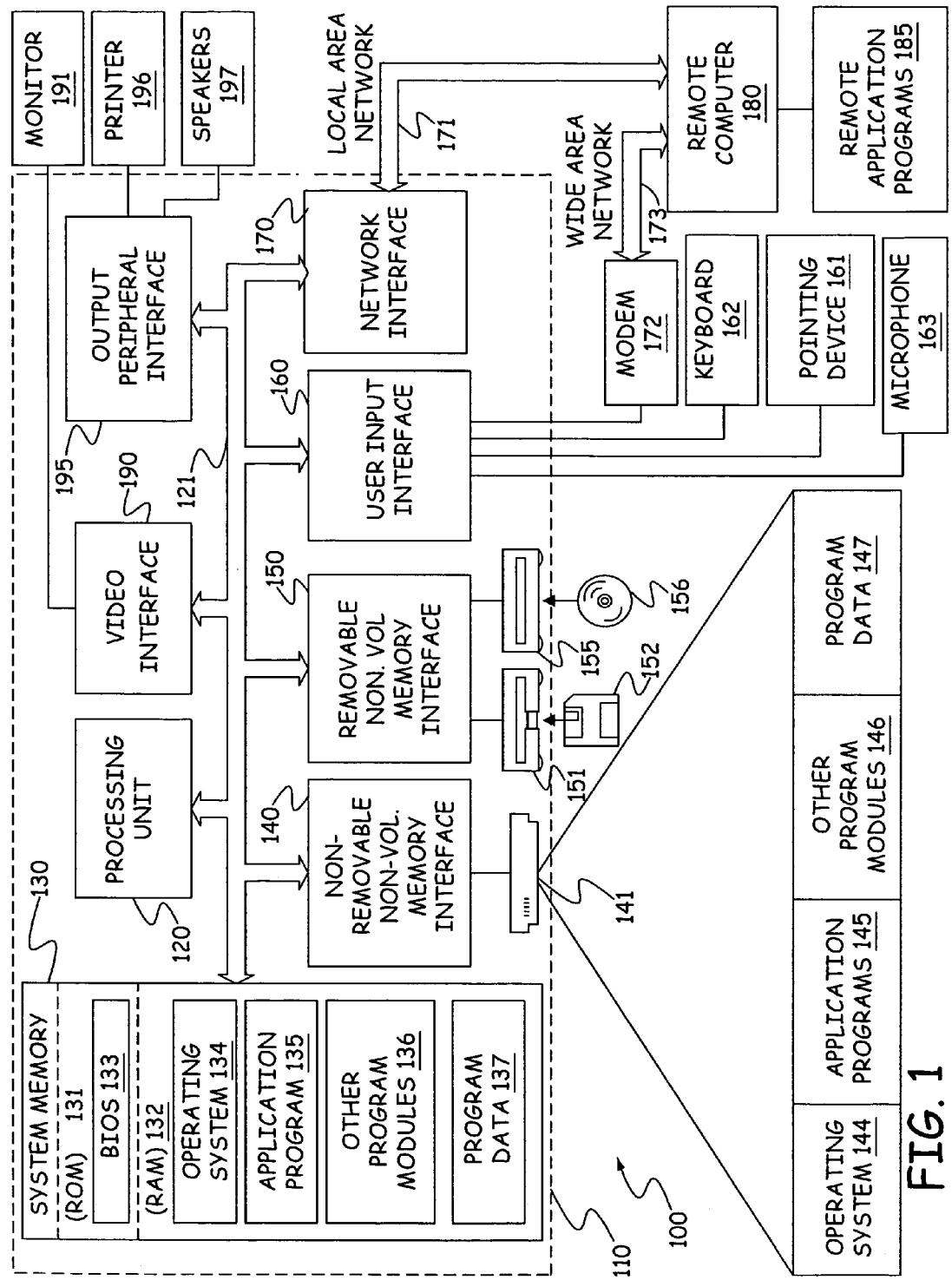
FIG. 1 is a block diagram of a one computing environment in which some embodiments may be practiced.

The disclosed localization tool, localizable object pattern, and methods can be embodied in a variety of computing environments, including personal computers, server computers, etc. Before describing the embodiments in greater detail, a discussion of an example computing environment in which the embodiments can be implemented may be useful. FIG. 1 illustrates one such computing environment which can represent any of these different types of computing environments.

FIG. 1 illustrates an example of a suitable computing system environment 100 on which one or more aspects of embodiments may be implemented. The computing system environment 100 is only one example of a suitable computing environment and is not intended to suggest any limitation as to the scope of use or functionality of the illustrated embodiments. Neither should the computing environment 100 be interpreted as having any dependency or requirement relating to any one or combination of components illustrated in the exemplary operating environment 100.

The illustrated embodiments are operational with numerous other general purpose or special purpose computing system environments or configurations. Examples of well-known computing systems, environments, and/or configurations that may be suitable for use with the illustrated embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The illustrated embodiments may be described in the general context of computer-executable instructions, such as program modules, being executed by a computer. Generally, program modules include routines, programs, objects, components, data structures, etc. that perform particular tasks or implement particular abstract data types. The illustrated embodiments may also be practiced in distributed computing environments where tasks are performed by remote processing devices that are linked through a communication network. In a distributed computing environment, program modules may be located in both local and remote computer storage media including memory storage devices. Tasks performed by the programs and modules are described below and with the aid of figures. Those skilled in the art can implement the description and figures provided herein as processor executable instructions, which can be written on any form of a computer readable medium.

With reference to FIG. 1, an exemplary system includes a general-purpose computing device in the form of a computer 110. Components of computer 110 may include, but are not limited to, a processing unit 120, a system memory 130, and a system bus 121 that couples various system components including the system memory to the processing unit. System bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, Intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Currently, many application program interfaces (APIs) which deal with localizable objects require the creation of multiple objects, each corresponding to a different language. In the alternative, these APIs sometimes currently deal with localization on a property by property basis rather then on entire object basis. These techniques often prevent the API from being transparent in multilingual aspect of objects in scenarios where it is applicable. Some disclosed embodiments provide methods and tools for handling localizable objects.

Figure 2:
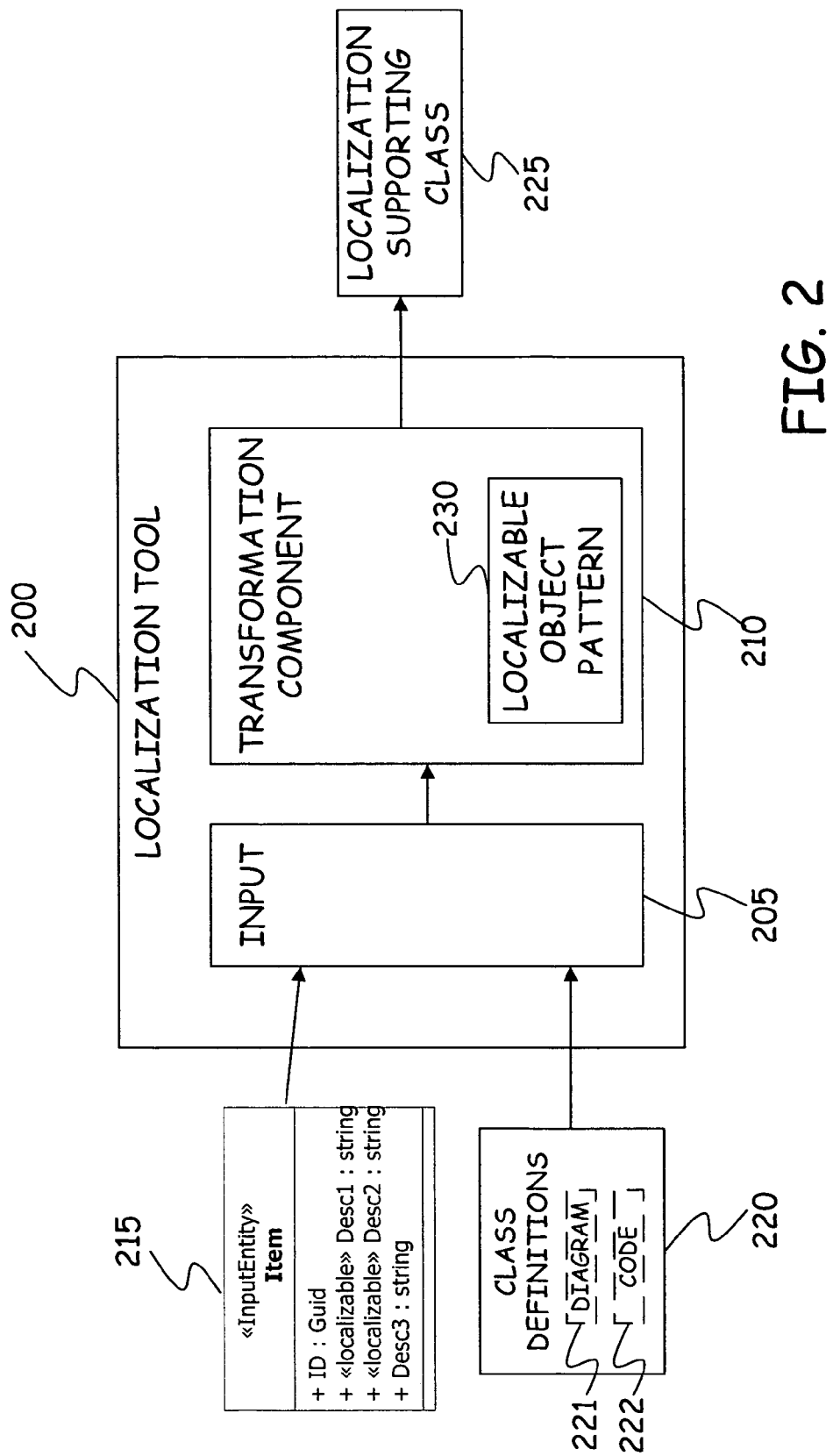
FIG. 2 is a block diagram of a localization tool.

Referring now to FIG. 2, shown is a localization tool 200 which can be used by designers of localizable classes or objects. As is understood in the art, in object oriented programming, objects are instances of classes. Disclosed embodiments can be described with reference to objects or classes. While aspects of the embodiments are described at times with reference to either classes or objects, those of skill in the art will recognize the applicability of the embodiments to objects and classes.

Localization tool 200 can be used by designers, and it is therefore described in terms of classes instead of objects, though it is applicable to both. The designer of an object can choose to localize class 215, which contains localizable properties or fields, using a localization tool 200. Localization tool 200 includes an input 205 which receives an input class 215 and a class definition 220. The input class and class definition illustrated in FIG. 2 are provided as examples only, and the disclosed embodiments are not limited to these examples. Class definition 220 can be, for example, a diagram 221 or code 222 that additionally contains information about which properties of the class 215 can be translated and which properties cannot.

Figures 1, 3:
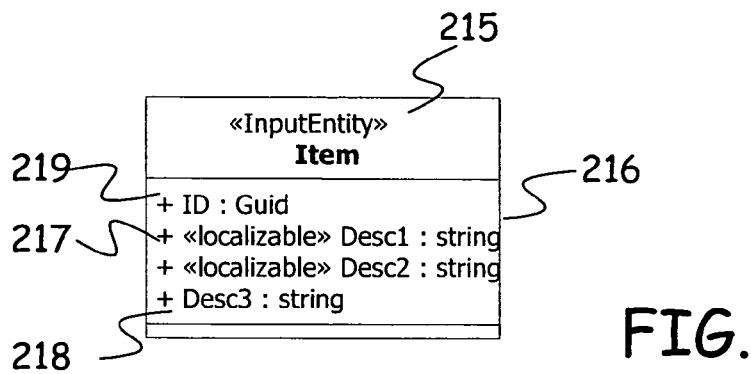
Figures 2, 3:
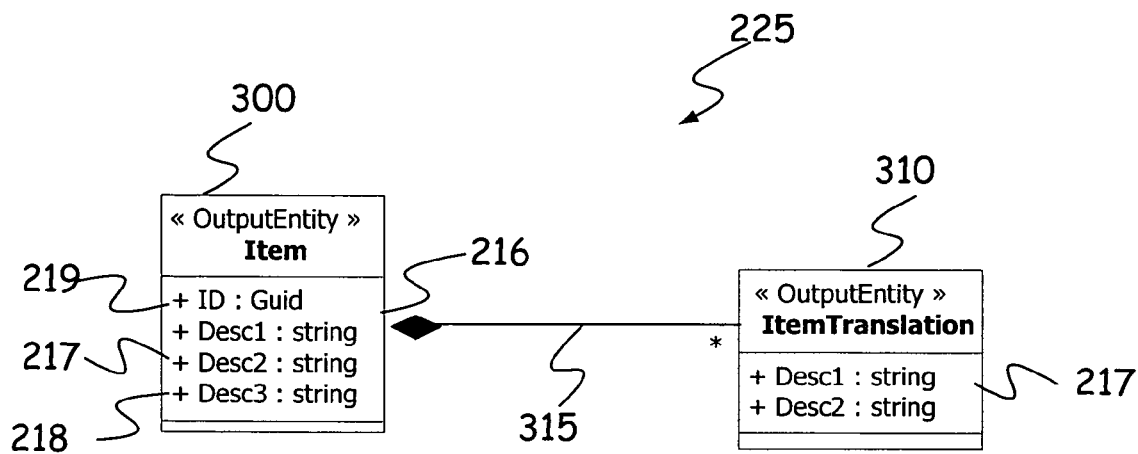

Input class 215 includes localizable (capable of being translated into another language) properties and non-localizable properties. For example, FIG. 3-1 illustrates an example of input class 215 in which properties 216 include both localizable properties 217 and non-localizable properties 218 (including id class or object id property 219). Localization tool 200 shown in FIG. 2 also includes a transformation component 210 configured to transform the input class 215 into a localization supporting class 225 by applying a localizable object pattern 230 to the input class 215. The output that the tool creates is code of the class 225 that supports localizability. The tool transforms the input class 215 by applying localizable object pattern 230 to it and outputs the transformed input.

Referring to FIG. 3-2, an example of one possible resulting localization supporting class 225 is provided. As can be seen, localization supporting class 225 includes a base-part class 300 and a translation-part class 310 having a composition relationship 315 with the base-part class 300. In example embodiments, an object of translation-part class 310 will be created for each language for which a translation is provided. Each object of translation-part class 310 will contain all localizable properties 217 of the input class 215 for which a translation is provided. Base-part class 300 contains all properties 218 of the input class 215 which are not localizable, plus all of localizable properties 217. In base-part class 300, the localizable properties are in a base language, for example a default language for the operating system.

The base-part class 300 also includes a current language property (shown and described with reference to FIG. 4-2) which acts as a language switch such that when a value of the current language property differs from the base language, accessing a localizable property of the base-part class 300 results in accessing a corresponding property of translation-part class 310 containing the localizable properties of the input class translated into that current language.

A description of the localizable object pattern 230 is now provided with reference to further examples. The pattern 230 involves splitting an input class into two parts: the base-part or object 300 and the translation-part or object 310. The translation-part 310 includes all properties that can and should be translated. The identification of these properties is achieved using class definitions 220 shown in FIG. 2. The base-part 300 of the object includes all properties that cannot or should not be translated (as a minimum it contains an object identity (e.g., shown at 219 in FIG. 3-2 and at 404 in FIG. 4-2) as well as all localizable properties that are stored in a most common language.

Adding all localizable properties to the base-part of the object enables the API to be transparent with respect to localizability. In other words, the caller of an object does not have to be aware of whether that object is localizable, and can treat the object as one-dimensional (although the object contains multiple dimensions, one for each language). The base-part part 300 of the object contains a collection of translation-parts (e.g., a composition relationship 315 between the base-part and translation-part). The base-part or object 300 also has a CurrentLanguage property (shown at 427 in FIG. 4-2) that acts like a language switch. Accessors of localizable properties of the object (getters and setters) contain code that sets or gets the value based on the property values stored in the translation collection or the base language stored in the base-part. This depends on the value of CurrentLanguage of the object: if it is the same as the base language, then backing store of an accessor is a private field in the base part 300, otherwise it is an element of the translation collection 310.

Figures 1, 4:
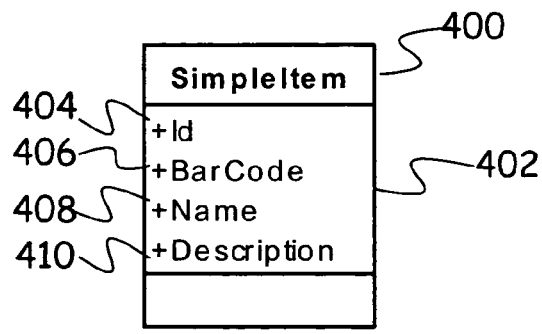
Figures 2, 4:
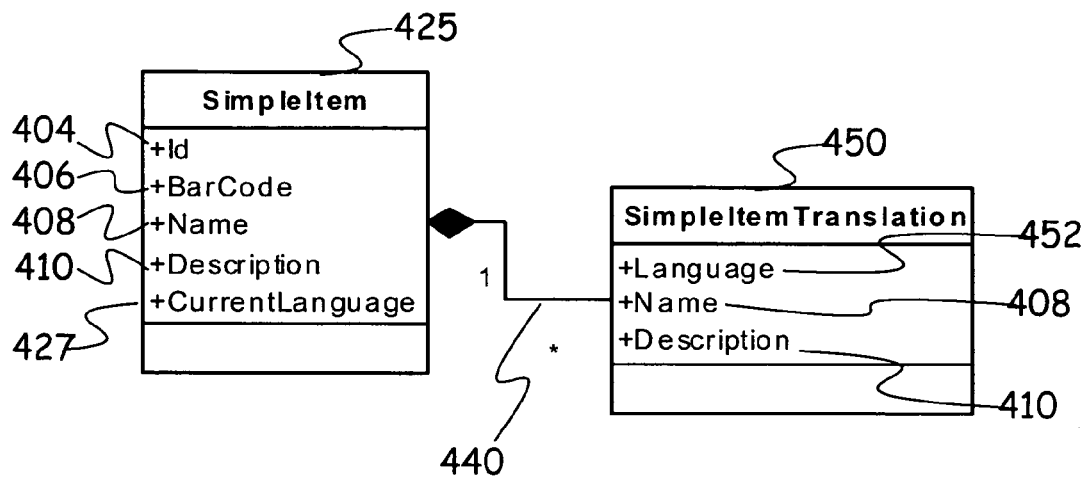

Consider the example provided in FIGS. 4-1 and 4-2. The SimpleItem class 400 includes an item identity property 404 and three other properties: BarCode 406, Name 408 and Description 410. The BarCode property 406 should not be localizable. The Name property 408 and the Description property 410 should be localizable.

After applying the localizable object pattern 230 the class 400 is transformed into the base-part class 425 (SimpleItem) and the translation-part class 450 (SimpleItem Translation), which have a composition relationship 440. Base-part class 425 includes all of the properties from class 400, including localizable and non-localizable properties. The localizable properties 408 and 410 will be in a base language. The translation-part class includes only the localizable properties 408 and 410, in a particular language, and a Language property 452 which identifies that language.

The API of the transformed SimpleItem class 425 does not break the API of the previous version of SimpleItem class 400. The collection containing SimpleItemTranslation elements (translation-part class 450) can be made private and data from the collection can be only accessible through Name and Description getters. In the alternative, the collection can be exposed thus leaving the alternative way of accessing translated data. Regardless, the accessor of a localizable property contains a code based on a CurrentCulture or global language switch that gets or sets data for that property in the base object or in the one of the child objects from the collection. The global language switch can be the operating system current language if there is one, or a global property added for the sake of the implementation of this feature if operating system does not support multiple languages or if the implementer wishes to have a current language independent from the OS settings. In example embodiments, CurrentLanguage property 427 of the object defaults from global language switch.

FIGS. 5-1 and 6-1 illustrate an API experience when programming against a localizable object. This example is written in C#, however the API experience is not limited to this language. The outputs of the code shown in FIGS. 5-1 and 6-1 is shown, respectively, in FIGS. 5-2 and 6-2.

Figures 1, 7:
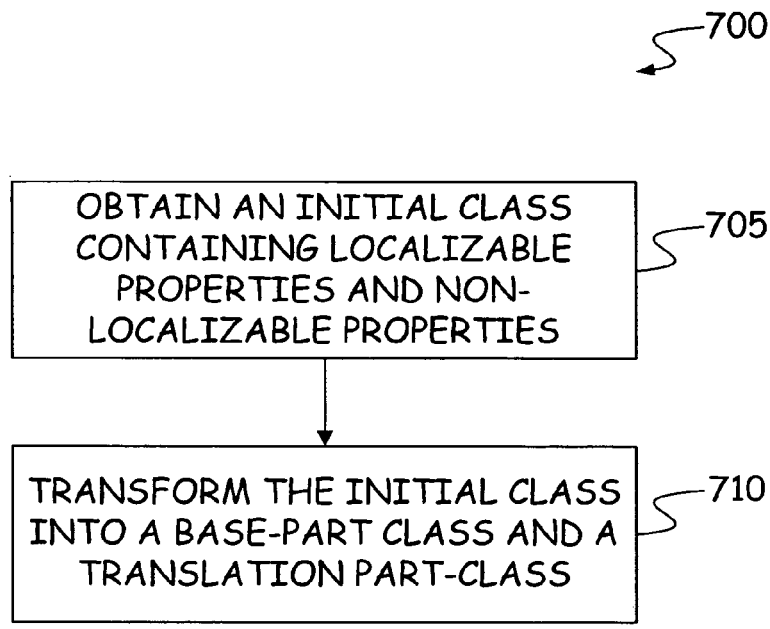
Figures 2, 7:
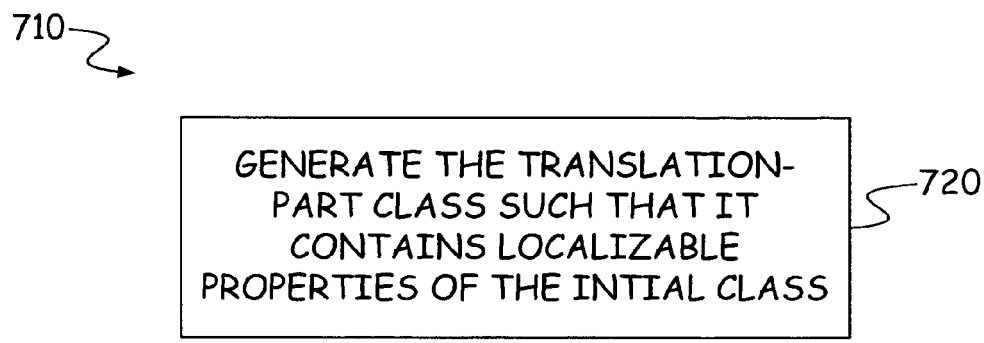
Figures 3, 7:
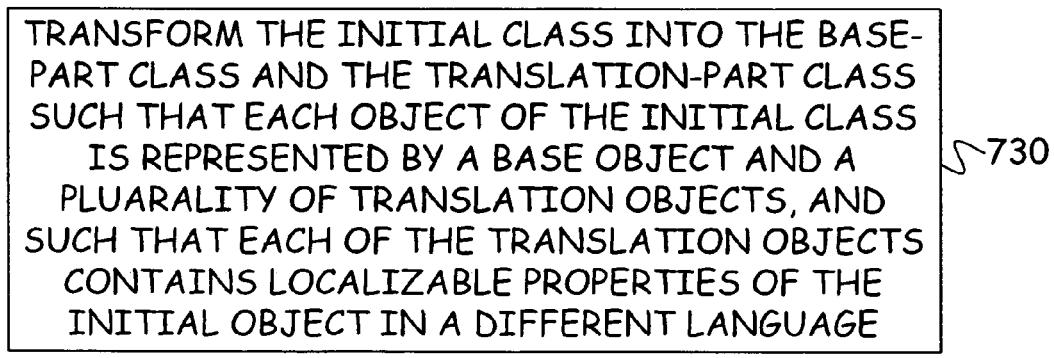

Referring now to FIG. 7-1 shown is a method 700 of handling localizable object classes. The method includes the step 705 of obtaining a first or initial class (e.g., class 400) containing localizable properties (e.g., properties 408; 410) and non-localizable properties (e.g., properties 404; 406). Initial class 400 can also be referred to as an initial class definition. As illustrated, the method next includes the step 710 of transforming the initial class 400 into a base-part class 425 and a translation-part class 450.

FIG. 7-2 illustrates a more particular embodiment of transforming step 710 in accordance with the above discussions. As shown at 720, transforming step 710 can include generating the translation-part class 450 such that it contains localizable properties 408 and 410 of the initial class 400. This generating step 720 can include generating the translation-part class 450 such that it contains all localizable properties of the initial class 400 for which a translation is provided, and such that it does not contain localizable properties for which no translation is provided.

FIG. 7-3 also illustrates a more particular embodiment of transforming step 710 in accordance with the above discussions. As shown at 730, transforming step 710 can include transforming the initial class 400 such that each object of that class is now represented by a base object 425 and a plurality of translation objects 450, such that each of the plurality of translation objects contains localizable properties (e.g., properties 408 and 410) of the initial object (corresponding to the initial class 400) in a different one of a plurality of languages.

FIG. 7-4 also illustrates a more particular embodiment of transforming step 710 in accordance with the above discussions. As shown at 740, transforming step 710 can include generating the base-part class 425 such that it contains all properties of the initial class 400 which are non-localizable, and all localizable properties of the initial class 400 in a base language.

FIG. 7-5 illustrates another more particular embodiment of transforming step 710 in accordance with the above discussions. As shown at 750, transforming step 710 can include applying a localizable object pattern 230 to the initial class 400 to generate the base-part class 425 and the translation-part class 450.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of processing localizable data structures, the method comprising:
obtaining an initial class containing localizable properties and non-localizable properties, the localizable properties including data that is translatable into multiple languages and the non-localizable properties including data that is not translatable into the multiple languages;
receiving a class definition that includes code that indicates which of the initial class properties are the localizable properties and which of the initial class properties are the non-localizable properties;
utilizing a computer processor that is a component of the computer and the class definition to apply a localizable object pattern to the initial class to transform the initial class into a base-part class and a plurality of translation-part classes, each of the plurality of translation-part classes corresponding to one of the multiple languages, the translation-part classes having a composition relationship with the base-part class, the plurality of translation-part classes being created for the multiple languages for which translations are provided, each of the translation-part classes including the localizable properties of the initial class and not including the non-localizable properties of the initial class, the base-part class including the localizable properties of the initial class and the non-localizable properties of the initial class, the localizable properties in the base-part class being in a base language of an operating system of the computer; and
including a current language property in the base-part class, the current language property acting as a language switch such that, when a value of the current language property indicates another one of the multiple languages that is different than the base language, then a process of accessing the base-part class to retrieve the localizable properties of the initial class includes accessing and substituting for the localized properties of the base-part class, the localizable properties in one of the translation part-classes, the one of the translation part-classes corresponding to the another one of the multiple languages that is different than the base language, the localizable properties in the one of the translation part-classes including a name and a description, and the localizable properties in the one of the translation part-classes not including an ID and a barcode that are included in the non-localizable properties of the base-part class.

2. The computer-implemented method of claim 1, wherein transforming the initial class into the base-part class and the plurality of translation-part classes comprises an application developer utilizing a localization tool implemented on the computer to transform the initial class.

3. The computer-implemented method of claim 2, wherein the initial class and the base-part class include corresponding indications of the ID and of the barcode, the ID and the barcode being included within the non-localizable properties.

4. The computer-implemented method of claim 3, wherein each of the localizable properties of the initial class, of the base-part class, and of the plurality of translation part-classes has a corresponding string.

5. The computer-implemented method of claim 4, wherein the indications of the barcode included in the initial class and the base-part class include numbers, and wherein at least some of the numbers within the initial class indication of the barcode match at least some of the numbers within the base-part class indication of the barcode.

6. A localization tool comprising:
an input that receives an initial class, wherein the input also receives a class definition that includes code that indicates which properties of the initial class are localizable properties and which properties of the initial class are non-localizable properties;
a computer processor that is a component of a computing device that utilizes a transformation component and the class definition to transform the initial class into a localization supporting class by applying a localizable object pattern to the initial class;

wherein the localization supporting class comprises a base-part class, as well as a translation-part class having a composition relationship with the base-part class;

wherein the translation-part class contains localizable properties of the initial class for which a translation is provided, and wherein the localizable properties include a name and description, but do not include an ID and a barcode that are included in non-localizable properties of the base-part class; and wherein the base-part class contains properties of the initial class which are not localizable, and also contains localizable properties of the initial class in a base language, and wherein the base-part class also contains a current language property that acts as a language switch such that, when a value of the current language property indicates a language that is different than the base language, then a process of accessing the base-part class to retrieve a particular one of the localizable properties of the initial class is modified such that a corresponding property of the translation-part class is instead accessed and substituted for the particular one of the localized properties, the corresponding property being equivalent to the particular one of the localizable properties translated into said language that is different than the base language; and wherein an application programming interface calls the localization supporting class, the application programming interface being unaware of whether the localization supporting class is localizable and treating the localization supporting class as being one-dimensional despite the localization supporting class being multi-dimensional, each of the multiple dimensions of the localization supporting class corresponding to a different language.

7. The localization tool of claim 6, wherein the base language is a language of an operating system of the computing device.

8. The localization tool of claim 7, wherein the localizable properties within the translation-part class are private and the private localizable properties are accessible through Name and Description getters.

9. The localization tool of claim 8, wherein the translation-part class includes a language property that identifies the language of the translation-part class.

10. A computer-implemented method of handling localizable object classes, the method comprising:

obtaining an initial class;

wherein obtaining the initial class further comprises obtaining a class definition that includes code that specifies which properties of the initial class are localizable and which properties of the initial class are not localizable;

utilizing a processor that is a component of the computer and the class definition to apply a localizable object pattern to transform the initial class into a base-part class containing non-localizable properties and a translation-part class containing localizable properties, wherein the base-part class contains a current language property that acts as a language switch such that, when a value of the current language property indicates a language that is different than a base language, then a process of accessing the base-part class to retrieve a particular localizable property of the initial class is modified such that a corresponding property of the translation-part class is instead accessed and substituted for the particular localized property, the corresponding property being equivalent to the particular localizable property translated into said language that is different than the base language;

wherein the translation-part class is accessed by exposing code within the translation-part class to an application programming interface;

wherein the computer has an operating system that does not support multiple languages;

wherein the localizable properties of the translation-part class include a name and a description but do not include an ID and a barcode that are included in the non-localizable properties of the base-part class;

wherein the current language property is added to the computer to support implementation of the translation-part class; and wherein the current language property is independent of a language of the operating system.

11. The computer-implemented method of claim 10, wherein the initial class includes indications of a class identifier, a barcode, a name, and a description, wherein the base-part class includes indications of the class identifier, the barcode, the name, the description, and the base language, and wherein the translation-part class includes indications of the name, the description, and the language that is different than the base language.

12. The computer-implemented method of claim 11, wherein transforming the initial class into the base-part class and the translation-part class further comprises generating the translation-part class such that it contains localizable properties of the initial class, and wherein the initial class, the base-part class, and the translation-part class are implemented as code in a programming language.

* * * * *